United States Patent [19]
Hiratsuka et al.

[11] Patent Number: 5,852,805
[45] Date of Patent: Dec. 22, 1998

[54] MPEG AUDIO DECODER FOR DETECTING AND CORRECTING IRREGULAR PATTERNS

[75] Inventors: Yukari Hiratsuka; Kazuhiro Sugiyama, both of Tokyo, Japan

[73] Assignee: Mitsubishi Denki Kabushiki Kaisha, Tokyo, Japan

[21] Appl. No.: 621,615

[22] Filed: Mar. 26, 1996

[30] Foreign Application Priority Data

Jun. 1, 1995 [JP] Japan .................................. 7-135075

[51] Int. Cl.⁶ ................................ G10L 9/14; G10L 5/00
[52] U.S. Cl. .......................... 704/500; 704/226; 704/212; 704/230
[58] Field of Search ..................... 395/2.1, 2.21, 395/2.35–2.39, 2.91

[56] References Cited

U.S. PATENT DOCUMENTS

| | | | |
|---|---|---|---|
| 4,972,484 | 11/1990 | Thelle et al. . | |
| 5,148,487 | 9/1992 | Nagai et al. | 395/2.74 |
| 5,612,979 | 3/1997 | Takano | 375/354 |
| 5,636,324 | 6/1997 | Teh et al. | 395/2.35 |
| 5,644,310 | 7/1997 | Laczko, Sr. et al. | 341/143 |

*Primary Examiner*—Allen R. MacDonald
*Assistant Examiner*—Alphonso A. Collins

[57] ABSTRACT

An MPEG audio decoder has an irregular-pattern processing circuit for detecting irregular patterns in the bit stream input to the decoder, and altering these irregular patterns, or altering data or signals derived from these irregular patterns, so that the irregular patterns do not cause annoying defects in the audio signal output from the decoder. The alteration may take the form of replacement by a minimum value, or interpolation of a preceding value.

20 Claims, 14 Drawing Sheets

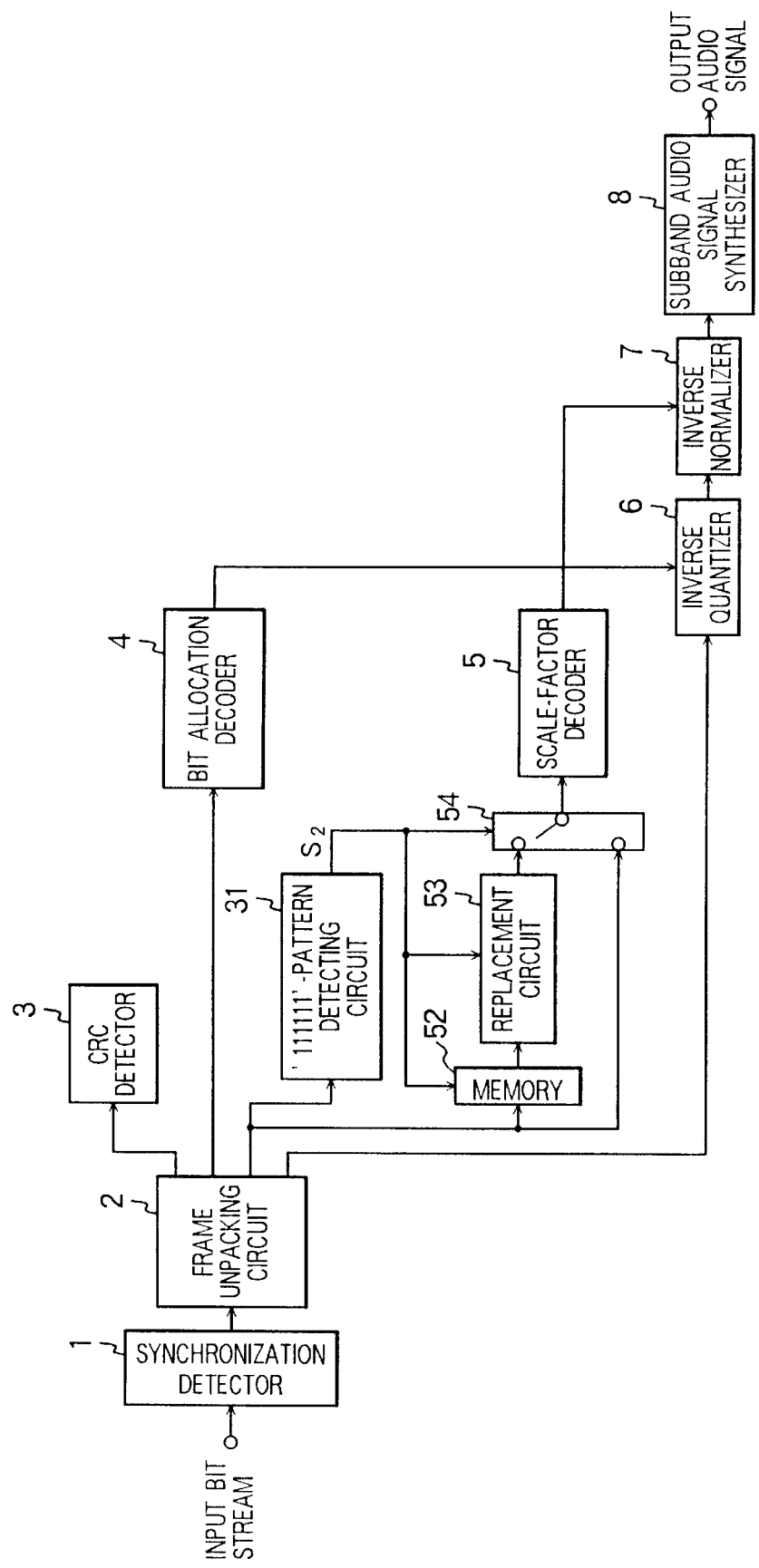

FIG. 8A

| ADDRESS | DATA IN MEMORY |
|---|---|
| 00000 | SCALE FACTOR FOR SUBBAND 1 |
| 00001 | SCALE FACTOR FOR SUBBAND 2 |
| 00010 | SCALE FACTOR FOR SUBBAND 3 |
| 00011 | SCALE FACTOR FOR SUBBAND 4 |
| ... | ... |
| 11101 | SCALE FACTOR FOR SUBBAND 30 |
| 11110 | SCALE FACTOR FOR SUBBAND 31 |
| 11111 | SCALE FACTOR FOR SUBBAND 32 |

FIG. 8B

| ADDRESS | DATA IN MEMORY | | |
|---|---|---|---|
| 00000 | SCALE FACTOR FOR PART 0 OF SUBBAND 1 | SCALE FACTOR FOR PART 1 OF SUBBAND 1 | SCALE FACTOR FOR PART 2 OF SUBBAND 1 |
| 00001 | SCALE FACTOR FOR PART 0 OF SUBBAND 2 | SCALE FACTOR FOR PART 1 OF SUBBAND 2 | SCALE FACTOR FOR PART 2 OF SUBBAND 2 |
| 00010 | SCALE FACTOR FOR PART 0 OF SUBBAND 3 | SCALE FACTOR FOR PART 1 OF SUBBAND 3 | SCALE FACTOR FOR PART 2 OF SUBBAND 3 |
| 00011 | SCALE FACTOR FOR PART 0 OF SUBBAND 4 | SCALE FACTOR FOR PART 1 OF SUBBAND 4 | SCALE FACTOR FOR PART 2 OF SUBBAND 4 |
| ... | ... | ... | ... |
| 11101 | SCALE FACTOR FOR PART 0 OF SUBBAND 30 | SCALE FACTOR FOR PART 1 OF SUBBAND 30 | SCALE FACTOR FOR PART 2 OF SUBBAND 30 |
| 11110 | SCALE FACTOR FOR PART 0 OF SUBBAND 31 | SCALE FACTOR FOR PART 1 OF SUBBAND 31 | SCALE FACTOR FOR PART 2 OF SUBBAND 31 |
| 11111 | SCALE FACTOR FOR PART 0 OF SUBBAND 32 | SCALE FACTOR FOR PART 1 OF SUBBAND 32 | SCALE FACTOR FOR PART 2 OF SUBBAND 32 |

FIG. 11

| ADDRESS | DATA IN MEMORY |
|---|---|
| 00000 | SAMPLE DATA FOR SUBBAND 1 |
| 00001 | SAMPLE DATA FOR SUBBAND 2 |
| 00010 | SAMPLE DATA FOR SUBBAND 3 |
| 00011 | SAMPLE DATA FOR SUBBAND 4 |
| ... | ... |
| 11101 | SAMPLE DATA FOR SUBBAND 30 |
| 11110 | SAMPLE DATA FOR SUBBAND 31 |
| 11111 | SAMPLE DATA FOR SUBBAND 32 |

FIG. 14

| ADDRESS | DATA IN MEMORY | | | |
|---|---|---|---|---|
| 00000 | SAMPLE DATA 1 FOR SUBBAND 1 | SAMPLE DATA 2 FOR SUBBAND 1 | SAMPLE DATA 3 FOR SUBBAND 1 | |
| 00001 | SAMPLE DATA 1 FOR SUBBAND 2 | SAMPLE DATA 2 FOR SUBBAND 2 | SAMPLE DATA 3 FOR SUBBAND 2 | |
| 00010 | SAMPLE DATA 1 FOR SUBBAND 3 | SAMPLE DATA 2 FOR SUBBAND 3 | SAMPLE DATA 3 FOR SUBBAND 3 | |
| 00011 | SAMPLE DATA 1 FOR SUBBAND 4 | SAMPLE DATA 2 FOR SUBBAND 4 | SAMPLE DATA 3 FOR SUBBAND 4 | |
| ... | ... | ... | ... | |
| 11101 | SAMPLE DATA 1 FOR SUBBAND 30 | SAMPLE DATA 2 FOR SUBBAND 30 | SAMPLE DATA 3 FOR SUBBAND 30 | |
| 11110 | SAMPLE DATA 1 FOR SUBBAND 31 | SAMPLE DATA 2 FOR SUBBAND 31 | SAMPLE DATA 3 FOR SUBBAND 31 | |
| 11111 | SAMPLE DATA 1 FOR SUBBAND 32 | SAMPLE DATA 2 FOR SUBBAND 32 | SAMPLE DATA 3 FOR SUBBAND 32 | |

MPEG AUDIO DECODER FOR DETECTING AND CORRECTING IRREGULAR PATTERNS

BACKGROUND OF THE INVENTION

The present invention relates to a decoder for decoding a digitized audio signal that has been encoded by a method standardized by the Moving Picture Experts Group.

The Moving Picture Experts Group (MPEG) works under the direction of the International Standards Organization (ISO) and International Electro-Technical Commission (IEC) to create standards for audio and video coding. The MPEG audio coding method is a perceptual coding method that exploits human physchoacoustic characteristics to compress digitized audio signals by substantial amounts with little or no detectable degradation of quality. It is anticipated that the MPEG method will be widely used in the fields of audio and video broadcasting, communications, and stored media. Applications have indeed already begun.

There are actually several standard MPEG audio coding methods, referred to as Layer One, Layer Two, and so on. Although there are some differences among the layers, basically these use a polyphase filter bank to divide an audio signal into thirty-two subbands, each sampled at 1/32 of the original sampling rate, and encode each subband separately. In the encoding process, the sample data in each subband are normalized by division by a scale factor, then quantized according to a bit allocation. The scale factor and bit allocation for each subband are selected on the basis of a spectral analysis, which is repeated at intervals referred to as frames.

The encoded bit stream is thus divided into frames consisting of various fields, including a bit-allocation field, a scale-factor field, and a sample-data field. The values in these fields are coded according to rules specified in the MPEG standard. Details will be given later.

One of the features of the MPEG coding rules is that for each field there are certain patterns, referred to as irregular patterns, which do not correspond to any scale factor, bit allocation, or sample data, and hence should never occur. Yet these irregular pattern do sometimes occur, due to transmission errors, for example. Conventional decoders, which are not designed to process the irregular patterns, tend to react to irregular patterns in ways that produce clicks or other irritating defects in the decoded audio signal.

SUMMARY OF THE INVENTION

It is accordingly an object of the present invention to reduce the unwanted effects caused by irregular patterns in an audio signal decoded according to the MPEG standard.

The invented MPEG audio decoder has an irregular-pattern processing circuit that detects the occurrence of an irregular pattern in the bit stream input to the decoder, and alters the irregular pattern itself, or the corresponding scale-factor value or sample data value, or the corresponding portion of the output audio signal, so that the irregular pattern does not produce an obtrusive defect in the output audio signal. The alteration may take the form of muting the output audio signal, replacing the affected portion of the output audio signal with a preceding portion of the output audio signal, or replacing the irregular pattern or corresponding value with a minimum value, or a pattern representing a minimum value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIG. 7 is a block diagram of a fifth embodiment.

FIG. 8A is a memory map pertaining to Layer One in the fifth embodiment.

FIG. 8A is a memory map pertaining to Layer Two in the fifth embodiment.

FIG. 11 is a memory map pertaining to Layer One in the seventh and ninth embodiments.

FIG. 14 is a memory map pertaining to Layer Two in the ninth embodiment.

DETAILED DESCRIPTION OF THE INVENTION

Embodiments of the invention will be described with reference to the attached illustrative drawings, after a more thorough description of the MPEG coding format and rules, and the conventional decoding steps.

Figure 1:
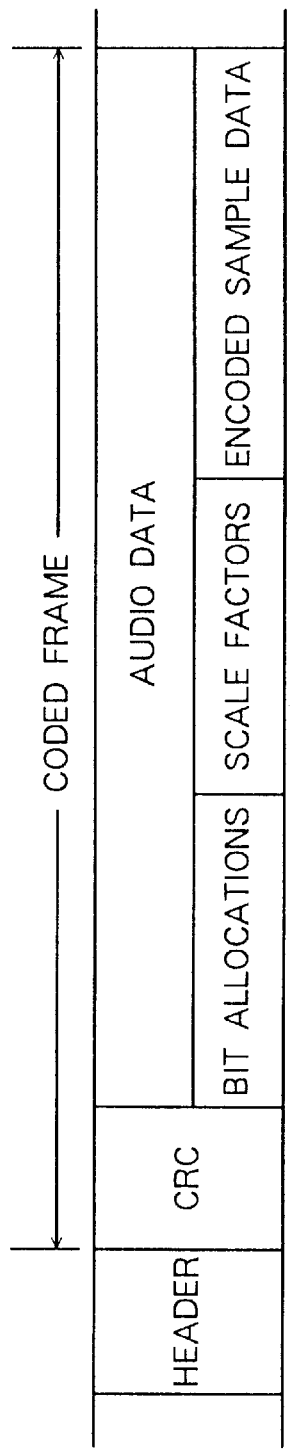
FIG. 1 illustrates the MPEG audio frame format.

Referring to FIG. 1, the MPEG-coded audio frame comprises a header, followed by an optional cyclic redundancy check (CRC) field, then by the audio data. The header information includes a synchronization pattern or syncword, and general information such as the sampling frequency and the MPEG Layer identifier. The CRC check field, if present, is used for detecting errors.

The audio data comprise encoded bit allocation information, scale-factor information, and sample data for each of thirty-two subbands. A Layer-One frame comprises audio data for twelve samples per subband. A Layer-Two frame comprises thirty-six samples per subband.

The bit allocation information specifies the number of bits assigned for quantization of each subband in the current frame. These assignments are made adaptively, according to the information content of the audio signal, so the bit allocation varies from frame to frame. The bit allocation information is coded according to slightly different rules in Layers One and Two.

Table 1 shows the bit allocation coding rule for Layer One. Sample data can be coded with zero bits (i.e., no data are present), or with two to fifteen bits per sample. The bit allocation information '1111' is an irregular pattern, not corresponding to any bit allocation. The number of steps refers to the number of quantization steps, which will be explained later.

The bit allocation coding rule for Layer Two is generally similar, but there are no irregular patterns. Further information will be given later.

TABLE 1

| Bit Allocation Information | Bits per Sample | Number of Steps |
|---|---|---|
| 0000 | 0 | 0 |
| 0001 | 2 | 3 |
| 0010 | 3 | 7 |
| 0011 | 4 | 15 |
| 0100 | 5 | 31 |
| 0101 | 6 | 63 |
| 0110 | 7 | 127 |
| 0111 | 8 | 255 |
| 1000 | 9 | 511 |
| 1001 | 10 | 1023 |
| 1010 | 11 | 2047 |
| 1011 | 12 | 4095 |
| 1100 | 13 | 8191 |
| 1101 | 14 | 16383 |
| 1110 | 15 | 32767 |
| 1111 | — | — |

The scale-factor information is coded in the same way, illustrated in Table 2, for both Layers One and Two. There are sixty-three possible scale factors. The scale factors are coded as six-bit index patterns from '000000' (zero) which designates the maximum scale factor, to '111110' (sixty-two) which designates the minimum scale factor. The pattern '111111' (sixty-three) is irregular, not corresponding to any scale factor.

TABLE 2

| Index | Scale Factor |
|---|---|
| 000000 | 2.00000000000000 |
| 000001 | 1.58740105196820 |
| 000010 | 1.25992104989487 |
| 000011 | 1.00000000000000 |
| 000100 | 0.79370052598410 |
| 000101 | 0.62996052494744 |
| 000110 | 0.50000000000000 |
| 000111 | 0.39685026299205 |
| 001000 | 0.31498026247372 |
| 001001 | 0.25000000000000 |
| 001010 | 0.19842513149602 |
| 001011 | 0.15749013123686 |
| 001100 | 0.12500000000000 |
| 001101 | 0.09921256574801 |
| 001110 | 0.07874506561843 |
| 001111 | 0.06250000000000 |
| 010000 | 0.04960628287410 |
| 010001 | 0.03937253280921 |
| 010010 | 0.03125000000000 |
| 010011 | 0.02480314143700 |
| 010100 | 0.01968626640416 |
| 010101 | 0.01562500000000 |
| 010110 | 0.01240157071850 |
| 010111 | 0.00984313320230 |
| 011000 | 0.00781250000000 |
| 011001 | 0.00620078535925 |
| 011010 | 0.00492156660115 |
| 011011 | 0.00390625000000 |
| 011100 | 0.00310039267963 |
| 011101 | 0.00246078330058 |
| 011110 | 0.00195312500000 |
| 011111 | 0.00155019633981 |

TABLE 2-continued

| Index | Scale Factor |
|---|---|
| 100000 | 0.00123039165029 |
| 100001 | 0.00097656250000 |
| 100010 | 0.00077509816991 |
| 100011 | 0.00061519582514 |
| 100100 | 0.00048828125000 |
| 100101 | 0.00038754908495 |
| 100110 | 0.00030759791257 |
| 100111 | 0.00024414062500 |
| 101000 | 0.00019377454248 |
| 101001 | 0.00015379895629 |
| 101010 | 0.00012207031250 |
| 101011 | 0.00009688727124 |
| 101100 | 0.00007689947814 |
| 101101 | 0.00006103515625 |
| 101110 | 0.00004844363562 |
| 101111 | 0.00003844973907 |
| 110000 | 0.00003051757813 |
| 110001 | 0.00002422181781 |
| 110010 | 0.00001922486954 |
| 110011 | 0.00001525878906 |
| 110100 | 0.00001211090890 |
| 110101 | 0.00000961243477 |
| 110110 | 0.00000762939453 |
| 110111 | 0.00000605545445 |
| 111000 | 0.00000480621738 |
| 111001 | 0.00000381469727 |
| 111010 | 0.00000302772723 |
| 111011 | 0.00000240310869 |
| 111100 | 0.00000190734863 |
| 111101 | 0.00000151386361 |
| 111110 | 0.00000120155435 |
| 111111 | — |

In Layer Two, the sample data in each frame are divided into three parts, each part consisting of twelve samples per subband. For each subband, a scale-factor selection code indicates whether the three pars have separate scale factors, or all three parts have the same scale factor, or two parts (the first two or the last two) have one scale factor and the other part has another scale factor. The selection codes and their meanings are explained in Table 3. The numerals [0], [1], and [2] denote the three parts.

TABLE 3

| Scale Factor Selection Code | Number of Scale Factors | Grouping of Parts |
|---|---|---|
| 00 | 3 | [0] [1] [2] |
| 01 | 2 | [0, 1] [2] |
| 10 | 1 | [0, 1, 2] |
| 11 | 2 | [0] [1, 2] |

We come now to the sample data. The sample values are normalized to numbers between plus and minus one. In MPEG Layer One, when the bit allocation designates n bits per sample, the normalized subband data are located in $2^n-1$ intervals referred to as quantization levels or steps, which are encoded by the binary numbers from zero to $2^n-2$. In decoding, the encoded sample data are dequantized to the center values of the quantization steps. The encoded sample-data pattern consisting of all 1's is irregular.

When the bit allocation is three bits, for example, the data are quantized and dequantized as shown in Table 4.

TABLE 4

| Quantization Step | Sample Data | Dequantized Value |
|---|---|---|
| — | 111 | — |
| 5/7 to 1 | 110 | 6/7 |
| 3/7 to 5/7 | 101 | 4/7 |
| 1/7 to 3/7 | 100 | 2/7 |
| −1/7 to 1/7 | 011 | 0 |
| −3/7 to −1/7 | 010 | −2/7 |
| −5/7 to −3/7 | 001 | −4/7 |
| −1 to −5/7 | 000 | −6/7 |

In Table 4, sample data value '011' (three) is dequantized to the minimum absolute value of zero. In general, sample data consisting of a single zero bit followed by all 1's ('011 . . . 11') will be dequantized to zero. The dequantization formula follows. C and D are constants given in Table 6, and n is the bit allocation.

Dequantized value=$C \times \{[(\text{sample data})/2^{n-1}]-1+D\}$

In Layer Two, three consecutive sample values in the same subband are referred to as a granule. The sample data for a granule can be grouped into a single shortened sample codeword. This grouping is performed when there are three, five, or nine quantization steps. (Five and nine quantization steps are not permitted in Layer One.) The sample code is calculated as indicated in Table 5, where x, y, and z are the three consecutive sample data values.

TABLE 5

| Number of Steps | Sample Code | Range of Values |
|---|---|---|
| 3 | 9z + 3y + x | 0 to 26 |
| 5 | 25z + 5y + x | 0 to 124 |
| 9 | 81z + 9y + x | 0 to 728 |

When there are three quantization levels or steps, grouping permits the three two-bit sample values to be coded in just five bits, instead of six. The encoded data patterns are binary numbers from '00000' (zero) to '11010' (twenty-six). The patterns from '11011' (twenty-seven) to '11111' (thirty-one) are irregular.

When there are five quantization steps, grouping permits three three-bit sample values to be coded in seven bits, instead of nine. The patterns '1111101,' '1111110' and '1111111' (the encoded values from 125 to 127) are irregular.

When there are nine quantization steps, three four-bit sample values are coded in ten bits. The patterns for encoded values from 729 to 1023 are irregular.

Table 6 lists the values of C and D for all numbers of quantization steps, and indicates whether granules of sample data are grouped into shortened sample codes in Layer Two.

TABLE 6

| Number of Steps | C | D | Grouping | Samples per Codeword | Bits per Codeword |
|---|---|---|---|---|---|
| 3 | 1.33333333333 | 0.50000000000 | Yes | 3 | 5 |
| 5 | 1.60000000000 | 0.50000000000 | Yes | 3 | 7 |
| 7 | 1.14285714286 | 0.25000000000 | No | 1 | 3 |
| 9 | 1.77777777777 | 0.50000000000 | Yes | 3 | 10 |
| 15 | 1.06666666666 | 0.12500000000 | No | 1 | 4 |
| 31 | 1.03225806452 | 0.06250000000 | No | 1 | 5 |
| 63 | 1.01587301587 | 0.03125000000 | No | 1 | 6 |
| 127 | 1.00787401575 | 0.01562500000 | No | 1 | 7 |
| 255 | 1.00787401575 | 0.00781250000 | No | 1 | 8 |
| 511 | 1.00787401575 | 0.00390625000 | No | I | 9 |
| 1023 | 1.00097751711 | 0.00195312500 | No | 1 | 10 |
| 2047 | 1.00048851979 | 0.00097656250 | No | 1 | 11 |
| 4095 | 1.00024420024 | 0.00048828125 | No | 1 | 12 |
| 8191 | 1.00012208522 | 0.00024414063 | No | 1 | 13 |
| 16383 | 1.00006103888 | 0.00012207031 | No | 1 | 14 |
| 32767 | 1.00003051851 | 0.00006103516 | No | 1 | 15 |
| 65535 | 1.00001525902 | 0.00003051758 | No | 1 | 16 |

Next a conventional MPEG audio decoder will be described. The elements of the conventional decoder will also be used as elements of the novel decoders to be described later.

Figure 2:
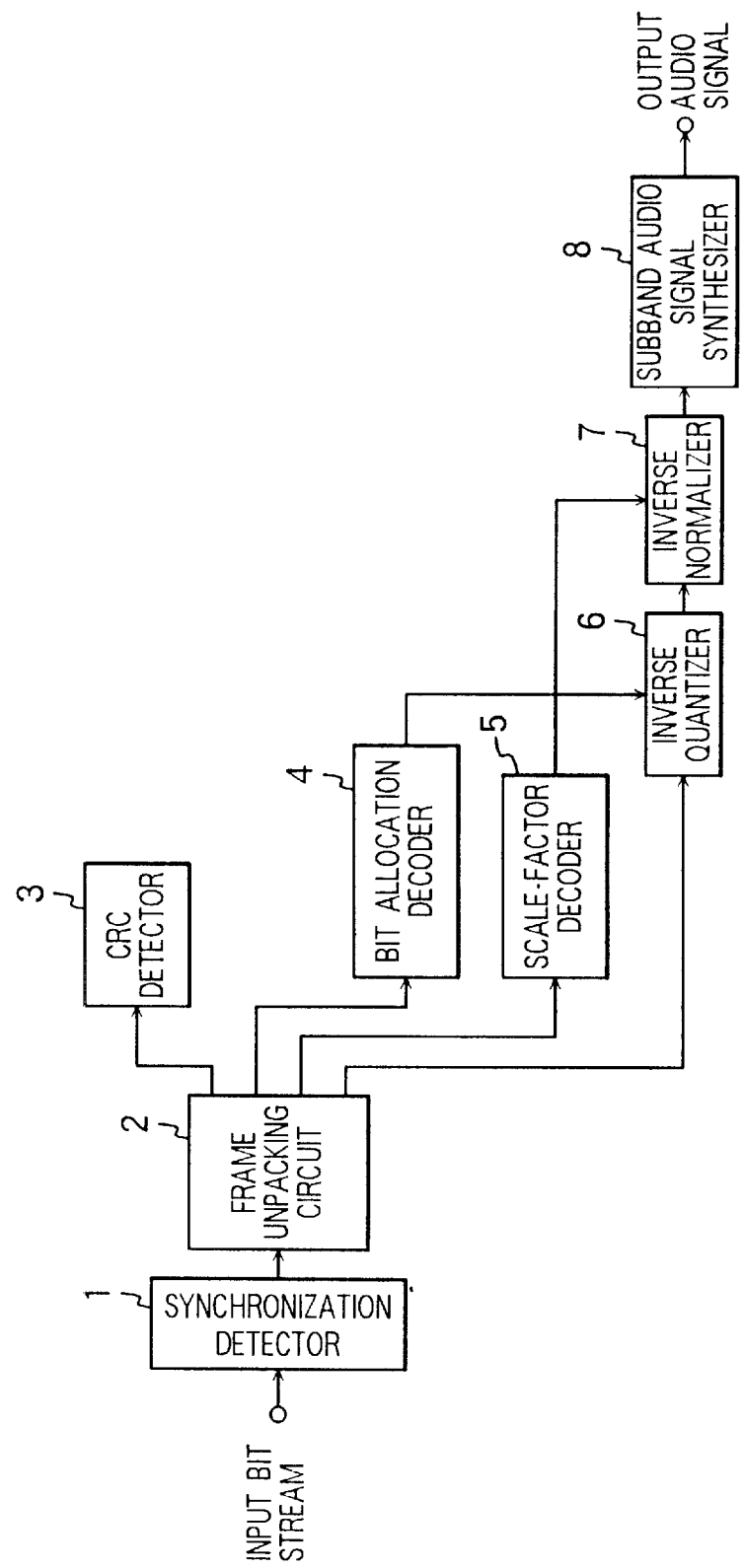
FIG. 2 is a block diagram illustrating a conventional MPEG audio decoder.

Referring to FIG. 2, the conventional MPEG audio decoder comprises a synchronization detector 1 for detecting the synchronization pattern in the frame headers of the input bit stream and acquiring synchronization, a frame unpacking circuit 2 for separating the header information, CRC code (if present), bit allocation information, scale-factor information, and sample data from the bit stream, a CRC detector 3 for checking the CRC code (if present), a bit allocation decoder 4 for decoding the bit allocation information, a scale-factor decoder 5 for decoding the scale-factor information, an inverse quantizer 6 for obtaining dequantized values from the sample data, an inverse normalizer y for obtaining denormalized values from the dequantized values, and a subband audio signal synthesizer 8 for generating an output audio signal from the denormalized values. These elements are interconnected as shown in the drawing.

Next, the conventional decoding operations will be described.

The input bit stream is scanned by the synchronization detector 1 to acquire and maintain synchronization. Once synchronization has been acquired, the frame unpacking circuit 2 extracts header information indicating the MPEG layer, the presence or absence of a CRC code, the bit rate, the sampling frequency, the number of channels, and other such information, and sets this information as parameter data for use in further decoding processes. The frame unpacking circuit 2 also separates the audio data in each frame into bit allocation information, scale-factor information, and sample data. If a CRC check code is present, the CRC detector 3 performs an error check on this information and data.

The bit allocation information unpacked by the frame unpacking circuit 2 is provided to the bit allocation decoder 4, which determines the number of bits per sample as listed in Table 1 (for MPEG Layer One), or the number of quantization levels as listed in Table 6 (for MPEG Layer Two). The scale-factor information is provided to the scale-factor decoder 5, which determines the scale-factor values from Table 2. The sample data are provided to the inverse quantizer 6, which selects the predetermined values of C and D from Table 6 according to output of the bit allocation decoder 4, and performs the dequantization operation described above.

The inverse normalizer 7 multiples the dequantized values by the scale factors obtained from the scale-factor decoder 5 to obtain denormalized values. The subband audio signal synthesizer 8 generates an output audio signal from the subband data given by the denormalized values.

Next the embodiments of the invented MPEG decoder will be described with reference to FIGS. 3 to 13. All of these embodiments include the conventional elements 1 to 8 shown in FIG. 2. Repeated descriptions of these elements and their operation will be omitted.

First embodiment

Figure 3:
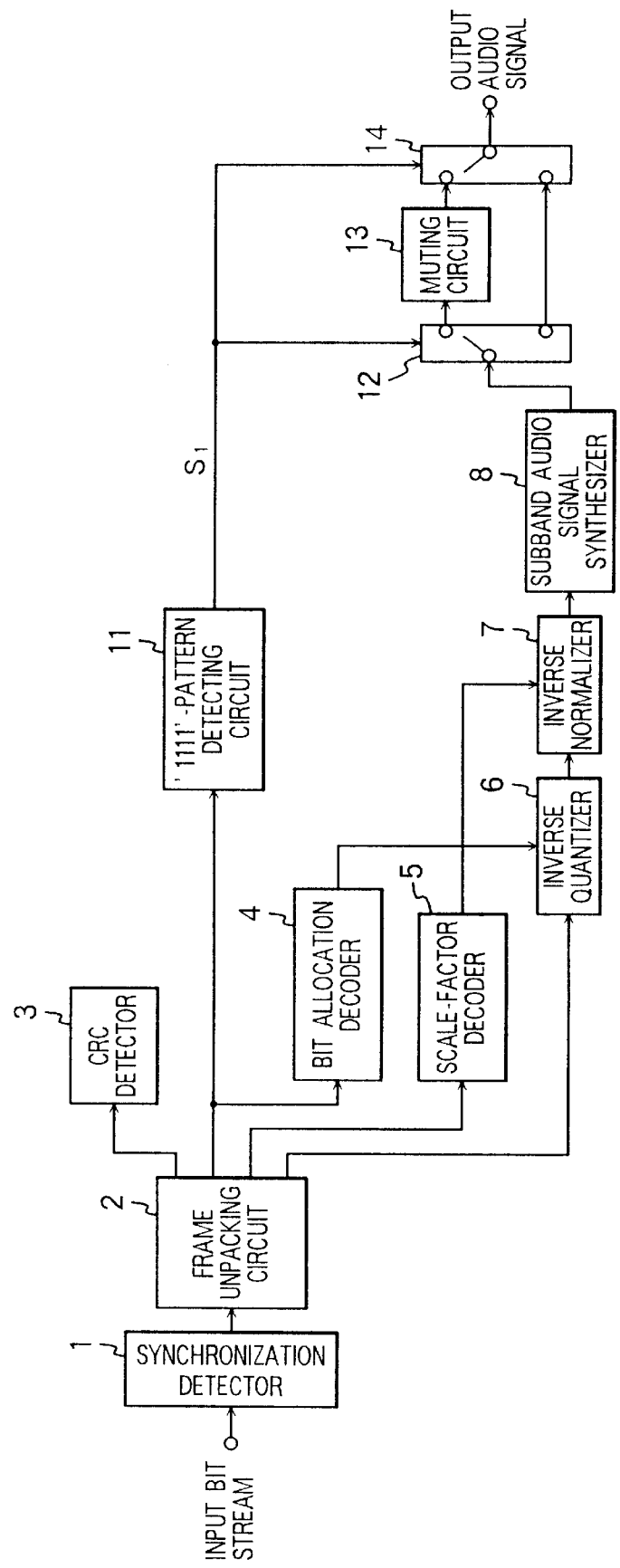
FIG. 3 is a block diagram of a first embodiment of the invention.

Referring to FIG. 3, the first embodiment comprises, in addition to the above-described conventional elements, a '1111'-pattern detecting circuit 11 for detecting the irregular bit allocation information pattern '1111' in Layer One, a switch 12 for routing the output from the subband audio signal synthesizer 8 responsive to the output of the '1111'-pattern detecting circuit 11, a muting circuit 13 for muting a first output of switch 12, and a switch 14 for selecting either the output of the muting circuit or the second output of the switch 12 as the output audio signal. These elements 11, 12, 13, and 14 are connected as shown in the drawing, and constitute an irregular-pattern processing circuit.

Next, the operation of the novel elements 11, 12, 13, and 14 will be described.

The '1111'-pattern detecting circuit 11 determines, from header information obtained from the frame unpacking circuit 2, whether or not the input bit stream is an MPEG Layer-One bit stream. If the bit stream is a Layer-One bit stream, the '1111'-pattern detecting circuit 11 checks every four-bit item of bit-allocation information, looking for the irregular pattern '1111,' and activates a '1111' detection signal $S_1$ when this pattern is found.

When signal $S_1$ is active, switches 12 and 14 are set as shown in the drawing. Switch 12 sends the output from the subband audio signal synthesizer 8 to the muting circuit 13, which reduces the volume of the output audio signal to the minimum level, for the duration of one frame. Switch 14 selects the resulting muted output of the muting circuit 13 as the audio output signal for that frame.

When signal $S_1$ is inactive, switches 12 and 14 are set to the opposite states, bypassing the muting circuit 13, so that the output audio signal is not muted.

The first embodiment thus operates in the conventional manner when the irregular pattern '1111' does not occur, and mutes the audio output signal when this irregular pattern is detected. Instead of producing unpredictable and irritating sounds, the irregular pattern '1111' causes only a barely perceptible momentary muting of the audio output.

When decoding a Layer-Two bit stream, the first embodiment always operates in the conventional manner.

Second embodiment

Figure 4:
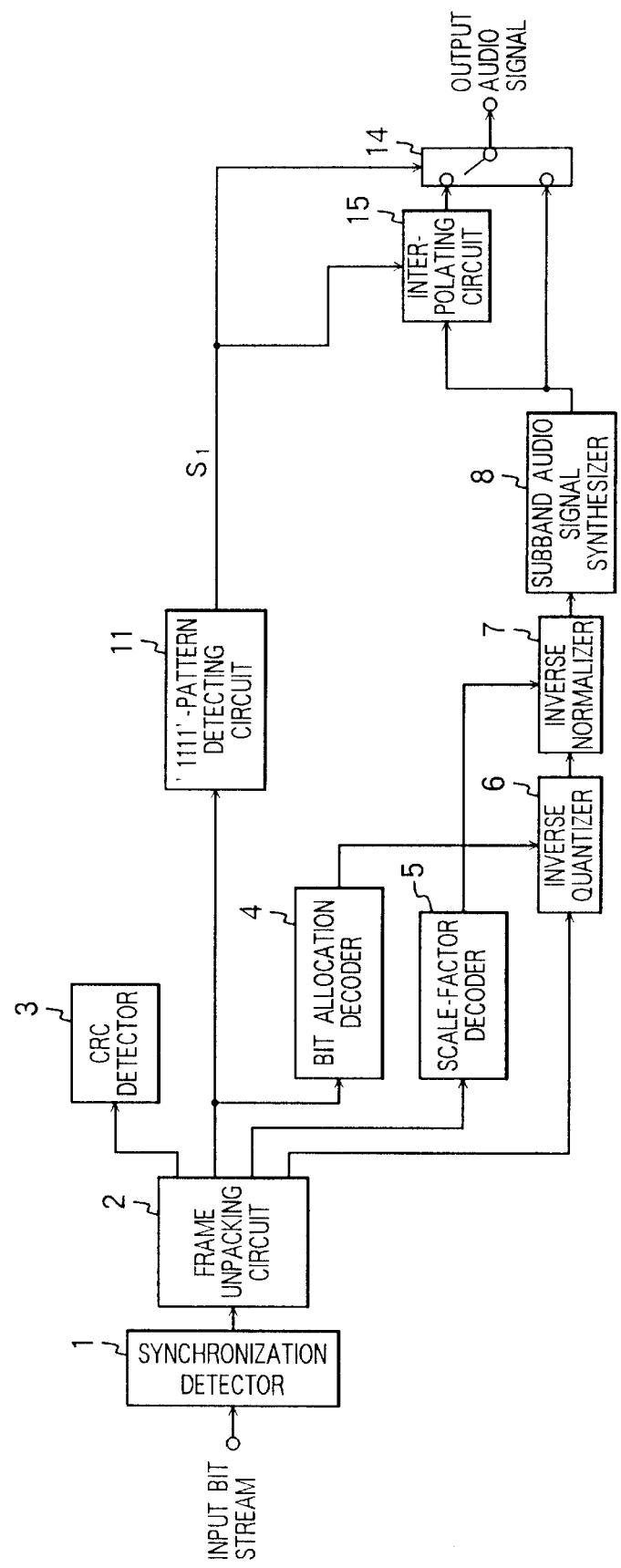
FIG. 4 is a block diagram of a second embodiment.

Referring to FIG. 4, the second embodiment has the same '1111'-pattern detecting circuit 11 and switch 14 as the first embodiment, and an interpolating circuit 15. The output of the subband audio signal synthesizer 8 is provided to both the switch 14 and interpolating circuit 15. The interpolating circuit 15 operates as a temporary memory or delay line that stores at least one frame of the audio output signal, responsive to the '1111'-pattern detection signal $S_1$, and supplies the stored signal to the switch 14. The three elements 11, 14, and 15 constitute the irregular-pattern processing circuit.

Next, the operation will be described. The operation of the '1111'-pattern detecting circuit 11 is the same as in the first embodiment, so a repeated description will be omitted.

When signal $S_1$ is inactive, the interpolating circuit 15 stores the frame currently being received from the subband audio signal synthesizer 8. The switch 14 selects the output of the subband audio signal synthesizer 8, so the normal output audio signal is obtained.

When signal $S_1$ is active, the interpolating circuit 15 does not store the current frame, which is at least partly invalid, and outputs the signal for the frame most recently stored, which was a valid frame, to the switch 14. The switch 14 selects the output of the interpolating circuit 15, so the invalid audio output signal is replaced with the most recent valid signal for one frame.

The disruption of the audio output signal caused by the irregular pattern '1111' is now substantially undetectable. The duration of a frame is so short that the replacement of one frame by the preceding frame is rarely noticeable. A smooth, natural output audio signal is obtained.

Third embodiment

Figure 5:
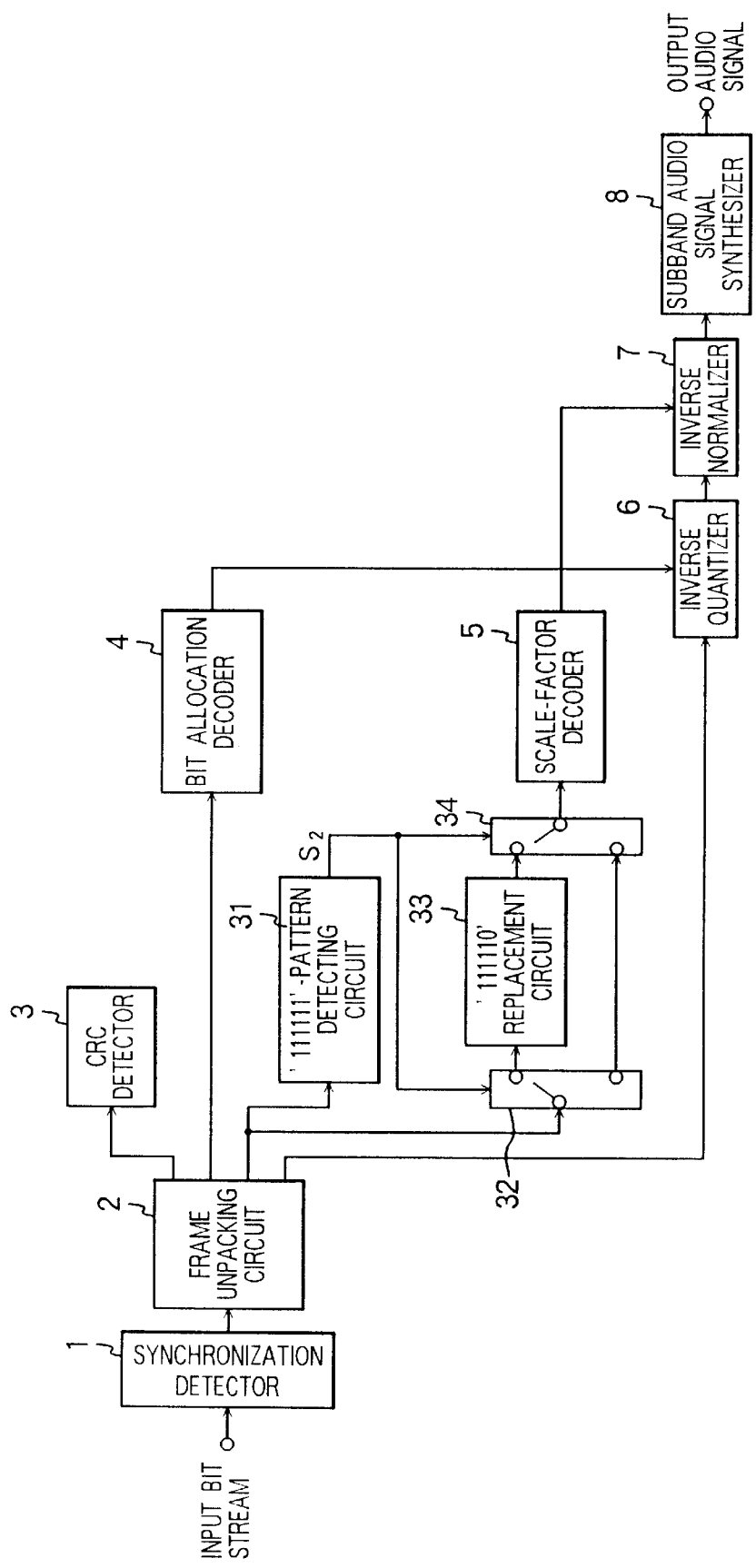
FIG. 5 is a block diagram of a third embodiment.

Referring to FIG. 5, the third embodiment has, in addition to the conventional elements 1 to 8, a '111111'-pattern detecting circuit 31 for detecting the irregular scale-factor information pattern '111111,' a switch 32 for routing the scale-factor information from the frame unpacking circuit 2 responsive to the output of the '111111'-pattern detecting circuit 31, a '111110' replacement circuit 33 for replacing scale-factor information received from the switch 32 with the index '111110' representing the minimum scale factor, and a switch 34 for selecting the output of switch 32 or the '111110' replacement circuit 33 for input to the scale-factor decoder 5. The fourth elements 31, 32, 33, and 34 constitute the irregular-pattern processing circuit.

Next the operation will be described.

The '111111'-pattern detecting circuit 31 receives the scale-factor information from the frame unpacking circuit 2, and checks each six-bit item of this information. When the irregular pattern '111111' is detected, the '111111'-pattern detecting circuit 31 activates a detection signal $S_2$. When the bit allocation information pattern is not irregular, signal $S_2$ is inactive.

When signal $S_2$ is active, the switches 32 and 34 are set as shown, routing the invalid bit allocation information pattern '111111' through the '111110' replacement circuit 33, so that the irregular pattern '111111' is replaced with the regular pattern '111110' designating the minimum scale factor (0.00000120155435). The subband data to which the irregular pattern '111111' applies are thereby scaled to a negligible level, making substantially no contribution to the output audio signal synthesized by the subband audio signal synthesizer 8.

When signal $S_2$ is inactive, the switches 32 and 34 are set to the opposite state, bypassing the '111110' replacement circuit, so that the decoder operates in the conventional manner.

The irregular pattern '111111' is thereby processed by scaling the affected subband with the minimum scale factor, converting what might have been a loud, obtrusive audio defect into small, barely perceptible defect.

Fourth embodiment

Figure 6:
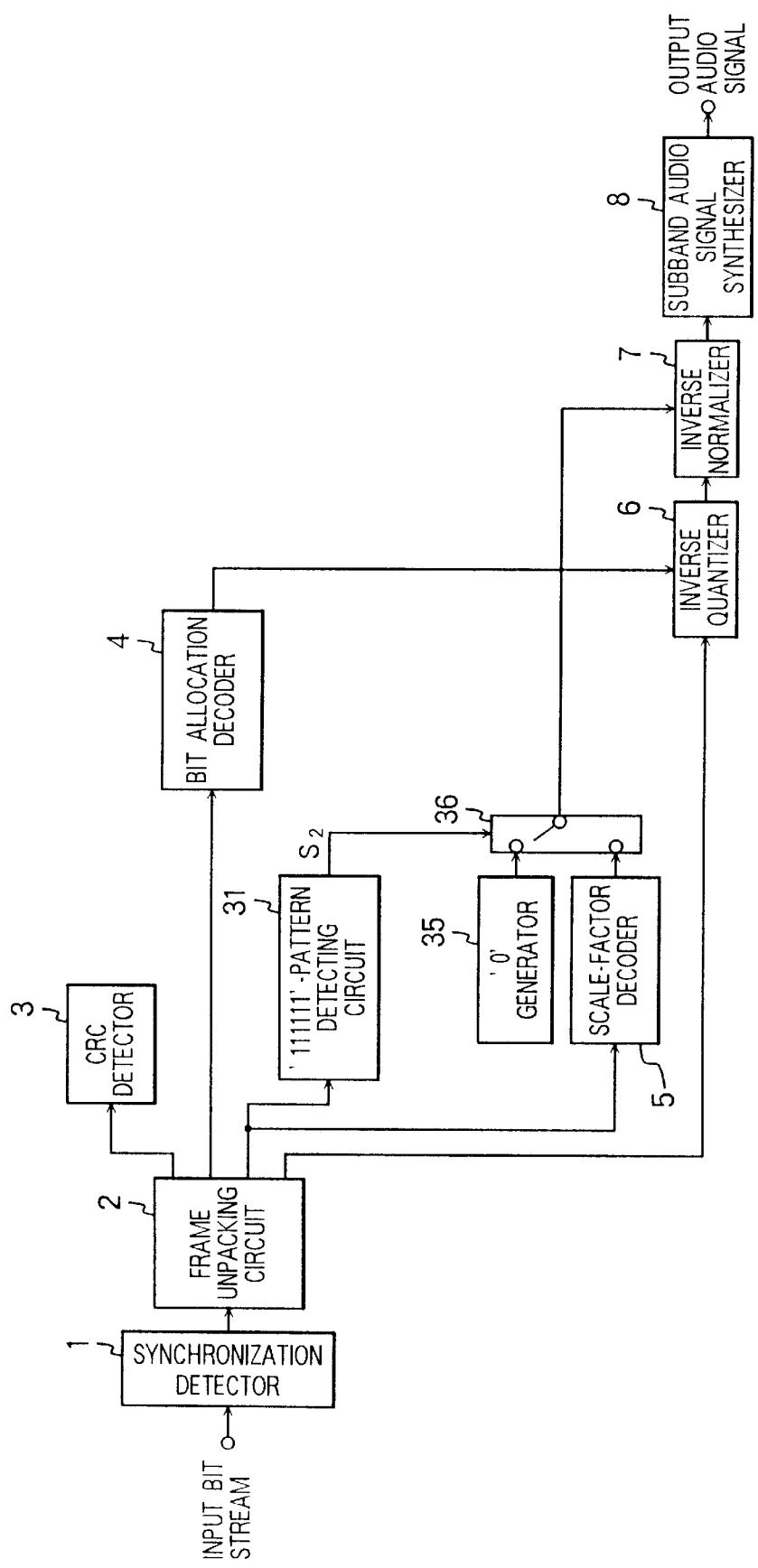
FIG. 6 is a block diagram of a fourth embodiment.

Referring to FIG. 6, the fourth embodiment has the same '111111'-pattern detecting circuit 31 as the third embodiment, a zero-generator 35, and a switch 36. The zero-generator 35 generates a scale factor value of zero. The switch 36 selects the output of the scale-factor decoder 5 or zero-generator 35, responsive to the signal $S_2$ output by the '111111'-pattern detecting circuit 31, and provides the selected value to the inverse normalizer 7. The three elements 31, 35, and 36 constitute the irregular-pattern processing circuit.

Next the operation will be described, omitting a repeated description of the operation of the '111111'-pattern detecting circuit 31.

When signal $S_2$ is inactive, switch 36 selects the output of the scale-factor decoder 5, and operations proceed in the conventional way.

When signal $S_2$ is active, the switch 36 selects the zero scale factor generated by the zero-generator 35. Subband data multiplied by this zero scale factor in the inverse normalizer 7 are completely removed from the output audio signal.

The fourth embodiment provides the same effect as the third embodiment. Potentially loud, obtrusive audio defects caused by the irregular pattern '111111' are converted into muted, barely perceptible defects.

Fifth embodiment

Referring to FIG. 7, the fifth embodiment has the same '111111'-pattern detecting circuit 31 as the third and fourth embodiments, and a memory 52, replacement circuit 53, and switch 54. The memory 52 stores scale-factor information temporarily, responsive to the signal $S_2$ output by the '111111'-pattern detecting circuit 31. The replacement circuit 53 replaces the irregular pattern '111111' with information selected from the memory 52, responsive to signal $S_2$. The switch 54 selects either the scale-factor information output by the frame unpacking circuit 2 or the output of the replacement circuit 53 for input to the scale-factor decoder 5. These four elements 31, 52, 53, and 54 constitute the irregular-pattern processing circuit.

Next the operation will be described, again omitting a description of the operation of the '111111'-pattern detecting circuit 31. The operation differs slightly between Layer One and Layer Two.

For a Layer-One input bit stream, scale-factor information is stored in the memory 52 as shown in FIG. 8A. Each of the thirty-two subbands is assigned one address in the memory 52, at which address one item of six-bit scale-factor information is stored. As each new item of scale-factor information is received from the frame unpacking circuit 2, if signal $S_2$ is inactive, the old scale-factor information for the same subband is replaced in the memory 52 with the new item. The new item is not stored when signal $S_2$ is active, indicating that the new item is the irregular pattern '111111.'

When signal $S_2$ is active, the replacement circuit 53 responds by replacing the irregular '111111' pattern with the valid pattern stored in the memory 52 at the same subband address. The switch 54 selects the output of the replacement circuit 53, so instead of receiving an irregular pattern, the scale-factor decoder 5 receives a valid pattern that applied to the same subband in a preceding frame.

For a Layer-Two input bit stream, one item of scale-factor information may apply to one, two, or three parts of a frame. If one item of scale-factor information applies to multiple parts, the frame unpacking circuit 2 generates and outputs corresponding identical copies of this scale-factor information. Thus for each frame, three items of scale-factor information are stored in the memory 52 for each subband, as shown in FIG. 8B.

For Layer Two, when signal $S_2$ is active, the replacement circuit 53 replaces the scale-factor information for all affected parts of the frame. The details of the replacement depend on the scale-factor selection code described in Table 3.

When the selection code is '00,' an irregular '111111' pattern applying to pat zero (the first part) of the subband data is replaced with the scale-factor information currently stored for part two (the last part) of the same subband, which applied to the preceding frame; an irregular '111111' pattern applying to part one is replaced with the scale-factor information for part zero; and an irregular '111111' pattern applying to part two is replaced with the scale-factor information for part one. When the scale-factor selection code is '01,' an irregular pattern applying to parts zero and one is replaced with the scale-factor information for part two of the same subband (which applied to the preceding frame), and an irregular pattern applying to part two is replaced with the scale-factor information for part one. When the scale-factor selection code is '10,' an irregular '111111' pattern applying to parts zero, one, and two of a frame is replaced with the scale-factor information for part two of the same subband in the preceding frame, which remains stored in the memory 52. When the scale-factor selection code is '11,' an irregular '111111' pattern applying to part zero is replaced with the scale-factor information for part two of the same subband in the preceding frame, and an irregular '111111' pattern applying to parts one and two is replaced with the scale-factor information for part zero.

When signal $S_2$ is inactive, the switch 54 selects the output of the frame unpacking circuit 2, and the fifth embodiment operates in the conventional manner.

In both Layers One and Two, the effect of the fifth embodiment is that scale-factor information with the irregular '111111' pattern is replaced with the most recent known valid scale-factor information for the same subband. Due to this replacement, the disturbance caused by the irregular pattern is substantially imperceptible, and a smooth, natural audio signal is obtained.

Sixth embodiment

Figure 9:
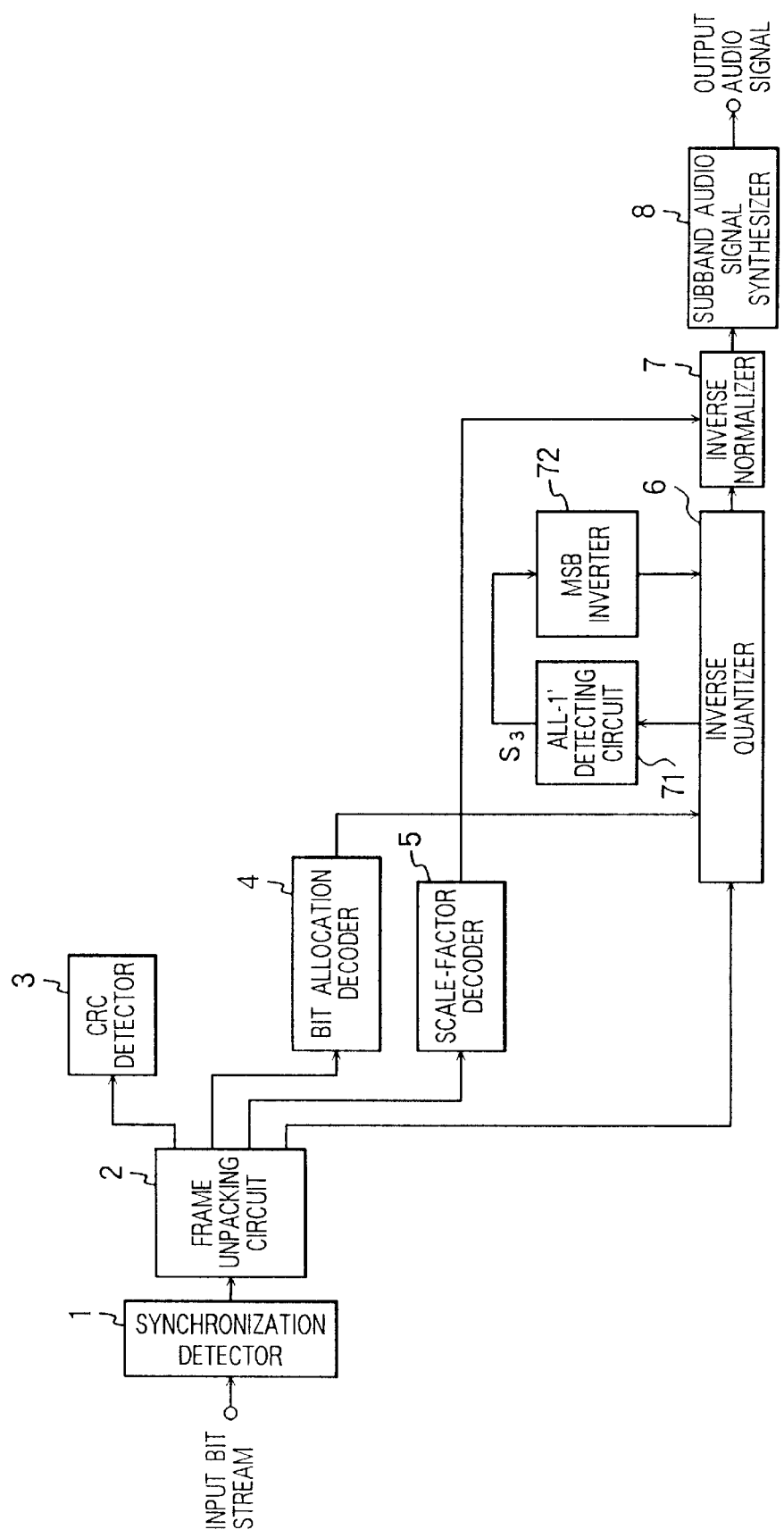
FIG. 9 is a block diagram of a sixth embodiment.

Referring to FIG. 9, the sixth embodiment comprises, in addition to the conventional elements 1 to 8, an 'all-1' detecting circuit 71 for detecting the irregular 'all-1' pattern in sample data received by the inverse quantizer 6, and a most-significant-bit (MSB) inverter 72 for inverting the MSB of this irregular pattern, thereby converting it to the pattern that is dequantized to zero. For example, when the bit allocation is three bits, the irregular pattern '111' is converted to '011.' Elements 71 and 72, both of which are coupled to the inverse quantizer 6, constitute the irregular-pattern processing circuit.

Next the operation of the novel elements will be described.

When the inverse quantizer 6 receives sample data other than the irregular 'all-1' pattern, it operates in the conventional manner. When the irregular 'all-1' pattern is received, the 'all-1' detecting circuit 71 detects the irregular pattern and notifies the MSB inverter 72 with a signals $S_3$. The MSB inverter 72 then inverts the MSB of the irregular 'all-1' pattern held in the inverse quantizer 6, thereby producing the pattern representing zero. The inverse quantizer 6 proceeds to process this pattern instead of the irregular 'all-1' pattern.

An irregular 'all-1' pattern in the sample data is thereby dequantized to a normalized sample value of zero. The resulting disturbance of the output audio signal is barely perceptible, if perceptible at all.

Seventh embodiment

Figure 10:
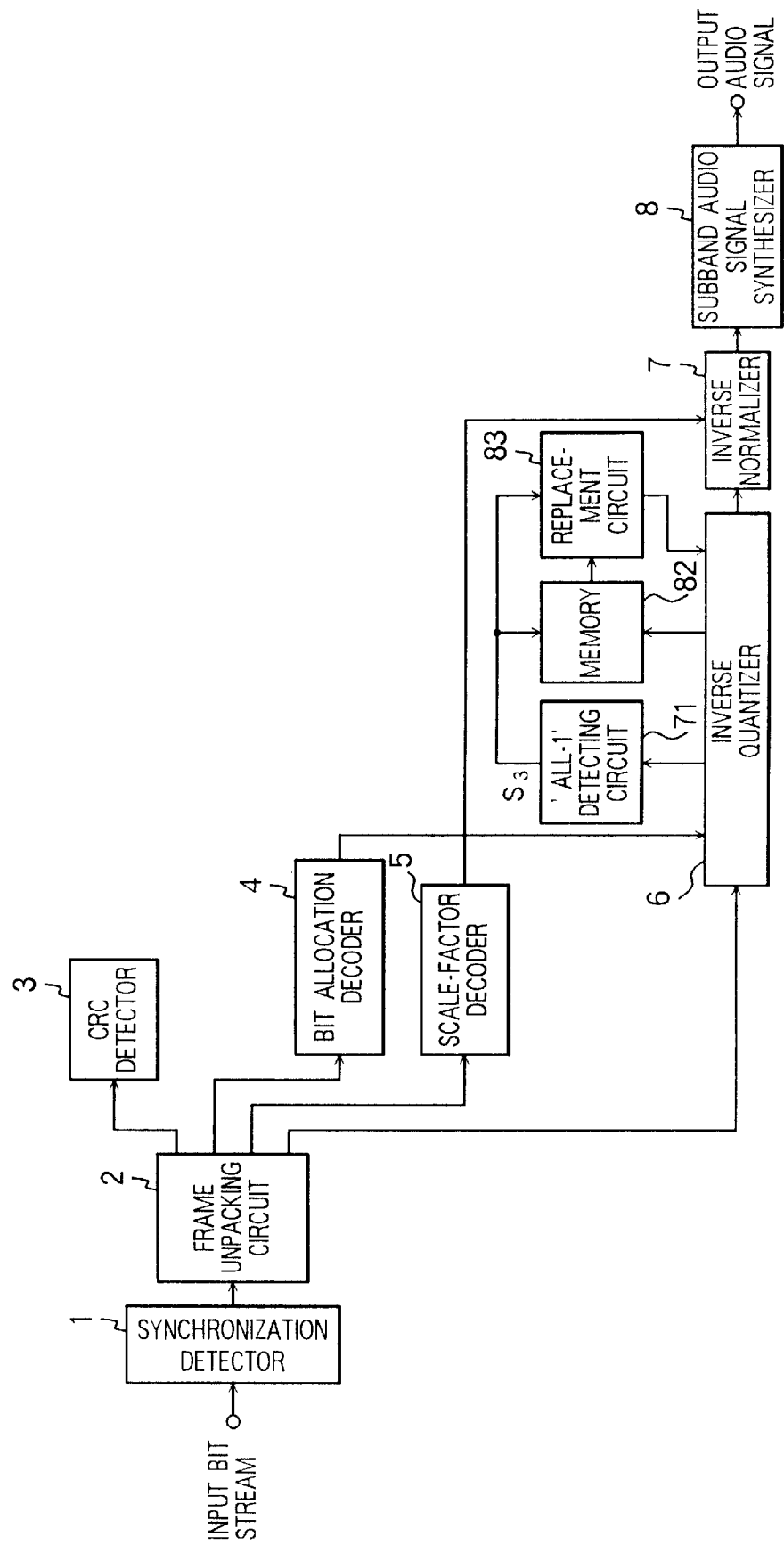
FIG. 10 is a block diagram of a seventh embodiment.

Referring to FIG. 10, the seventh embodiment 7 has the same 'all-1' detecting circuit 71 as in the sixth embodiment, a memory 82 for temporarily storing sample data, and a replacement circuit 83 for replacing the irregular 'all-1' pattern with data stored in the memory 82. These three elements 71, 82, and 83, all of which are coupled to the inverse quantizer 6, constitute the irregular-pattern processing circuit.

Next the operation of the irregular pattern processing circuit in the seventh embodiment will be described.

The memory 82 has space for storing one sample data pattern for each subband, as illustrated in FIG. 11. When signal $S_3$ is inactive, the sample data received by the inverse quantizer 6 are stored in the memory 82 at their respective subband addresses. When signal $S_3$ is active, identifying the irregular 'all-1' pattern, this pattern is not stored, leaving the previous sample data for the same subband unchanged.

When signal $S_3$ is inactive, the inverse quantizer 6 processes the sample data in the conventional manner. When signal $S_3$ is active, however, the replacement circuit 83 replaces the irregular 'all-1' pattern received by the inverse quantizer 6 with the old sample data pattern stored for the same subband in the memory 82, and the inverse quantizer 6 uses the old data again.

By making this replacement, the seventh embodiment can process the irregular 'all-1' pattern in the sample data with a minimum of disturbance. The effect on the output audio signal will normally be undetectable to the ear; the output audio signal will have a smooth and natural sound.

Eighth embodiment

Figure 12:
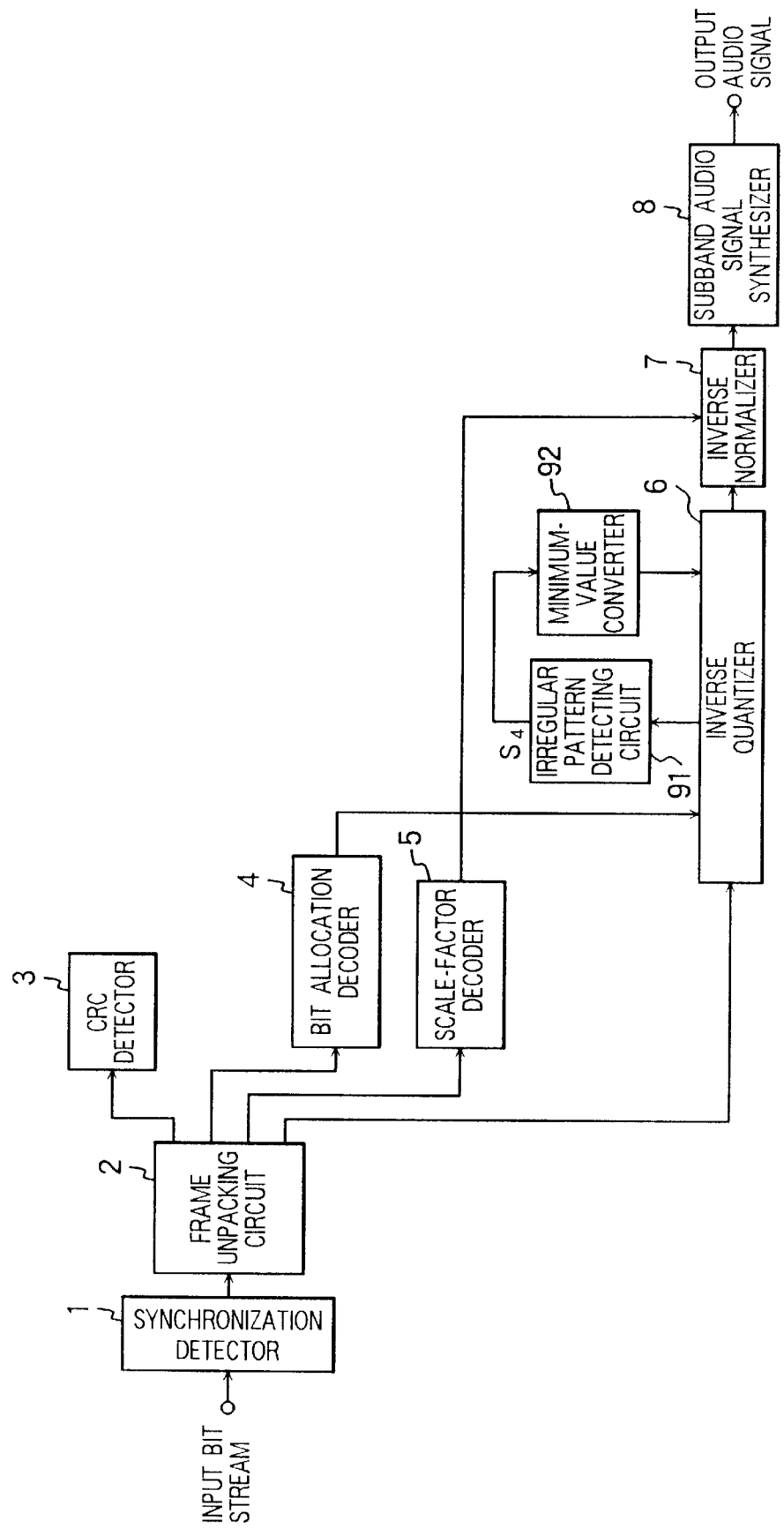
FIG. 12 is a block diagram of an eighth embodiment.

Referring to FIG. 12, the eighth embodiment has, in addition to the conventional elements 1 to 8, an irregular pattern detecting circuit 91 and a minimum-value converter 92 coupled to the inverse quantizer 6. These two elements 91 and 92 constitute the irregular-pattern processing circuit.

Next the operation of the irregular-pattern processing circuit will be described.

The irregular pattern detecting circuit 91 detects not only the irregular 'all-1' pattern, but also the other irregular patterns which occur in grouped sample codes when there are three, five, or nine quantization steps in Layer Two. The signal $S_4$ produced by circuit 91 is active when any one of these irregular patterns is detected.

When signal $S_4$ is active, the minimum-value conversion circuit 92 converts all of the sample data derived from the irregular pattern received by the inverse quantizer 6, consisting of either one or three sample values, to the sample data '011 . . . 11' which the inverse quantizer 6 dequantizes to zero.

The eighth embodiment provides the same effect as the sixth embodiment for a Layer-One input bit stream. For Layer Two, the eighth embodiment provides the additional effect of catching irregular sample data patterns other than the 'all-1' pattern.

Ninth embodiment

Figure 13:
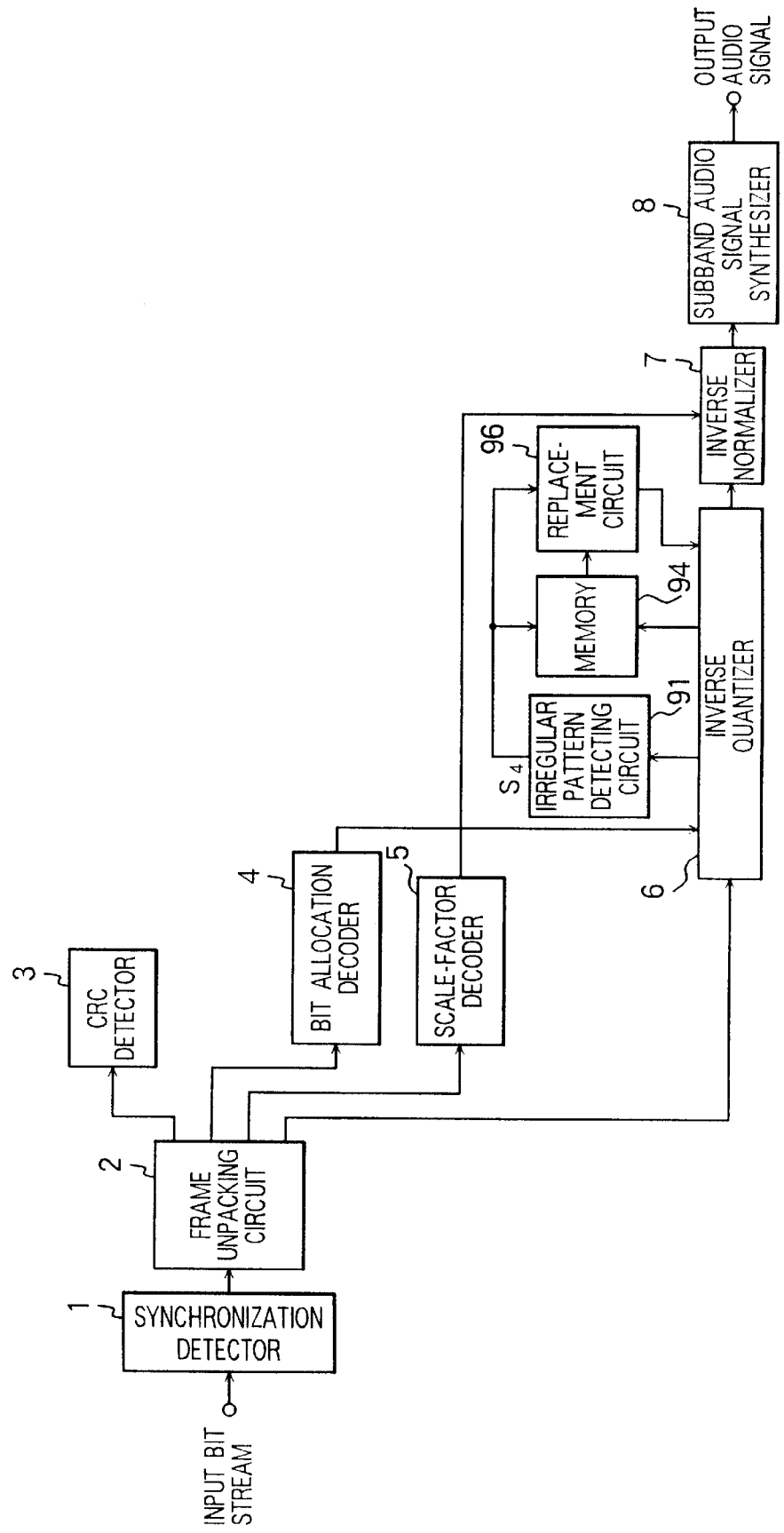
FIG. 13 is a block diagram of a ninth embodiment.

Referring to FIG. 13, the ninth embodiment has the same irregular pattern detecting circuit 91 as the eighth embodiment, as well as a memory 94 and a replacement circuit 96. These elements 91, 94, and 96, all of which are coupled to the inverse quantizer 6, constitute the irregular-pattern processing circuit.

Next, the operation of the irregular-pattern processing circuit will be described.

When the input bit stream is a Layer-One bit stream, as indicated by header information, the ninth embodiment operates much like the seventh embodiment. The memory 94 stores one sample data value for each subband, these values being updated when signal $S_4$ is inactive. When the irregular 'all-1' pattern is detected, the memory 94 is not updated, and the replacement circuit 96 replaces the invalid sample data with a preceding, valid sample data value, obtained from the memory 94.

When the input bit stream is a Layer-Two bit stream, the memory 94 stores three sample data values per subband, as shown in the memory map in FIG. 14. When the irregular pattern detecting circuit 91 detects an irregular pattern, the replacement circuit 96 replaces the affected sample data with the most recent known valid sample data for the same subband. If the number of quantization steps is three, five, or nine, then due to the grouping described in Table 5, all three sample data values in one granule are invalid, so the replacement circuit 96 replaces all three values with the sample data value stored for the third sample of the preceding granule (designated sample data 3 in FIG. 14). For other numbers of quantization steps, the samples are not grouped, so only one value is affected: if the first sample data value in the granule is affected, it is replaced with the third value of the preceding granule, which is still stored in the memory 94; if the second sample data value is affected, it is replaced with the first sample data value in the same granule; and if the third sample data value is affected, it is replaced with the second sample data value in the same granule.

The effect of the ninth embodiment is similar to the effect of the seventh embodiment, except that in Layer Two, all irregular sample data patterns are replaced by preceding valid sample data, creating a smooth, natural output audio signal.

The invention is not limited to the embodiments described above; the embodiments can be combined in various ways to create a novel decoder that processes all irregular patterns, whether they be bit allocation information patterns, scale-factor information patterns, or sample data patterns. It suffices to combine one embodiment selected from the first and second embodiments with one embodiment selected from among the third, fourth, and fifth embodiments and one embodiment selected from among the sixth, seventh, eighth, and ninth embodiments.

The invention can be practices in hardware, by providing circuits with the functions indicated in the drawings, or in software, by programming a digital signal processor or other processor to carry out equivalent functions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An MPEG audio decoder for decoding an input bit stream including a plurality of frames coded according to an MPEG audio coding method, comprising:

frame unpacking means for unpacking header information, bit allocation information, scale-factor information, and sample data from each of said frames;

bit allocation decoding means coupled to said frame unpacking means, for decoding said bit allocation information to obtain decoded bit allocation values;

scale-factor decoding means coupled to said frame unpacking means, for decoding said scale-factor information to obtain decoded scale-factor values;

inverse quantizing means coupled to said frame unpacking means, for dequantizing said sample data according to said decoded bit allocation information to obtain dequantized sample values;

inverse normalizing means coupled to said inverse quantizing means, for denormalizing said dequantized sample values according to said decoded scale-factor values to obtain denormalized sample values;

subband audio signal synthesizing means coupled to said inverse normalizing means, for synthesizing an output audio signal from said denormalized sample values; and irregular-pattern processing means, coupled to at least one means among said frame unpacking means, said bit allocation decoding means, said scale-factor decoding means, said inverse quantizing means, said inverse normalizing means, and said subband audio signal synthesizing means, for detecting irregular patterns in said bit allocation information, said scale-factor information or said sample data and for altering at least one entity among said decoded scale-factor values, said sample data, said dequantized sample values, and said output audio signal, when said irregular patterns are detected, thereby preventing said irregular patterns from causing defects in said output audio signal.

2. The MPEG audio decoder of claim 1, wherein said irregular-pattern processing means comprises:

a '1111'-pattern detecting means for detecting irregular patterns equal to '1111' in said bit allocation information, when said header information indicates that said input bit stream is encoded according to MPEG Layer One; and a muting means for muting said output audio signal when an irregular pattern equal to '1111' is detected in said bit allocation information by said '1111'-pattern detecting means.

3. The MPEG audio decoder of claim 1, wherein said irregular-pattern processing means comprises:

a '1111'-pattern detecting means for detecting irregular patterns equal to '1111' in said bit allocation information, when said header information indicates that said input bit stream is encoded according to MPEG Layer One; and an interpolating means for replacing one portion of said output audio signal with a preceding portion of said output audio signal, when an irregular pattern equal to '1111' is detected in said bit allocation information by said '1111'-pattern detecting means.

4. The MPEG audio decoder of claim 1, wherein said irregular-pattern processing means comprises:

a '111111'-pattern detecting means for detecting irregular patterns equal to '111111' in said scale-factor information; and a replacement means for replacing said irregular patterns equal to '111111' with scale-factor information equal to '111110' which is decoded to a scale-factor value of '0.00000120155435' by said scale-factor decoding means.

5. The MPEG audio decoder of claim 1, wherein said irregular-pattern processing means comprises:

a '111111'-pattern detecting means for detecting irregular patterns equal to '111111' in said scale-factor information;

a zero-generator for generating a scale-factor value equal to zero; and a switch for replacing a scale-factor value output by said scale-factor decoding means with said scale-factor value equal to zero, when said '111111'-pattern detecting means detects an irregular pattern equal to '111111.'

6. The MPEG audio decoder of claim 1, wherein said irregular-pattern processing means comprises:

a '111111'-pattern detecting means for detecting irregular patterns equal to '111111' in said scale-factor information;

a first memory for temporarily storing said scale-factor information, when said '111111'-pattern detecting means does not detect an irregular pattern equal to '111111;' and a replacement means for replacing an irregular pattern equal to '111111' detected by said '111111'-pattern detecting means with preceding scale-factor information stored in said first memory.

7. The MPEG audio decoder of claim 1, wherein said irregular-pattern processing means comprises:

an 'all-1' detecting means for detecting irregular 'all-1' patterns in the sample data received by said inverse quantizing means; and an MSB inverting means for inverting a most significant bit of the irregular 'all-1' patterns detected by said 'all-1' detecting means, thereby converting said irregular 'all-1' patterns to patterns representing a dequantized sample value of zero.

8. The MPEG audio decoder of claim 1, wherein said irregular-pattern processing means comprises:

an 'all-1' detecting means for detecting irregular 'all-1' patterns in the sample data received by said inverse quantizing means;

a memory for temporarily storing the sample data received by said inverse quantizing means, when said 'all-1' detecting means does not detect an irregular 'all-1' pattern; and a replacement means for replacing the irregular 'all-1' patterns detected by said 'all-1' detecting means with sample data stored in said memory.

9. The MPEG audio decoder of claim 1, wherein said irregular-pattern processing means comprises:

an irregular sample-data-pattern detecting means for detecting irregular patterns in the sample data received by said inverse quantizing means, said irregular patterns including an 'all-1' pattern and, when said header information and said bit allocation information designate MPEG Layer Two and a number of quantization steps equal to one of the integers three, five, and nine, at least one other pattern; and a minimum-value converting means for converting all sample data values derived from the irregular patterns detected by said irregular sample-data-pattern detecting means to sample data values representing dequantized sample values of zero, and furnishing said sample data values representing dequantized sample values of zero to said inverse quantizing means to be dequantized.

10. The MPEG audio decoder of claim 1, wherein said irregular-pattern processing means comprises:

an irregular sample-data-pattern detecting means for detecting irregular patterns in the sample data received by said inverse quantizing means, said irregular patterns including an 'all-1' pattern and, when said header information and said bit allocation information designate MPEG Layer Two and a number of quantization steps equal to one of the integers three, five, and nine, at least one other irregular pattern;

a second memory for temporarily storing the sample data received by said inverse quantizing means, when said irregular sample-data-pattern detecting means does not detect an irregular pattern; and a replacement means for replacing all sample data values derived from the irregular patterns detected by said irregular sample-data-pattern detecting means with sample data stored in said second memory, and furnishing said sample data stored in said second memory to said inverse quantizing means to be dequantized.

11. A method of decoding an input bit stream coded according to an MPEG audio coding method by unpacking said input bit stream into header information, bit allocation information, scale-factor information, and sample data, dequantizing and denormalizing said sample data according to said bit allocation information and scale-factor information to obtain subband data representing subband components in successive frames, and synthesizing an output audio signal from said subband data, comprising the steps of:

determining from said header information whether said input bit stream conforms to MPEG Layer One;

detecting irregular patterns equal to '1111' in said bit allocation information, when said input bit stream conforms to MPEG Layer One; and altering said audio output signal, when an irregular pattern equal to '1111' is detected, thereby preventing said irregular pattern equal to '1111' from causing a defect in said output audio signal.

12. The method of claim 11, wherein said step of altering comprises muting said audio output signal for one frame.

13. The method of claim 11, wherein said step of altering comprises replacing the audio output signal for the frame affected by said irregular pattern with the audio output signal for a preceding frame.

14. A method of decoding an input bit stream coded according to an MPEG audio coding method by unpacking said input bit stream into header information, bit allocation information, scale-factor information, and sample data, dequantizing and denormalizing said sample data according to said bit allocation information and scale-factor information to obtain subband data, and synthesizing an output audio signal from said subband data, comprising the steps of:

detecting irregular patterns in said scale-factor information or said sample data; and replacing said irregular patterns with patterns that are not irregular, thereby preventing said irregular patterns from causing defects in said output audio signal.

15. The method of claim 14, wherein said step of replacing comprises replacing said irregular patterns with patterns received previously in said input bit stream.

16. The method of claim 14, wherein said step of replacing comprises replacing an irregular pattern of scale-factor information equal to '111111' with the pattern '111110' representing a scale factor of 0.00000120155435.

17. The method of claim 14, wherein said step of replacing comprises replacing an irregular pattern of sample data with a pattern representing a dequantized sample value of zero.

18. The method of claim 14, wherein said input bit stream conforms to MPEG Layer Two, comprising the further steps of:

detecting irregular patterns representing granules of sample data; and when an irregular pattern representing a granule of sample data is thus detected, replacing all sample data in said granule with sample data representing a dequantized data value of zero.

19. The method of claim 14, wherein said input bit stream conforms to MPEG Layer Two, comprising the further steps of:

storing said sample data in a memory;

detecting irregular patterns representing granules of sample data; and when an irregular pattern representing a granule of sample data is thus detected, replacing all sample data in said granule with a single value selected from said memory.

20. A method of decoding an input bit stream coded according to an MPEG audio coding method by unpacking said input bit stream into header information, bit allocation information, scale-factor information, and sample data, dequantizing and denormalizing said sample data according to said bit allocation information and scale-factor information to obtain subband data, and synthesizing an output audio signal from said subband data, comprising the steps of:

decoding said scale-factor information to obtain a scale factor;

detecting scale-factor information equal to '111111;' and replacing said scale-factor with a scale factor equal to zero when scale factor information equal to '111111' is detected by said detecting step.

* * * * *